(12) United States Patent
Brown

(10) Patent No.: US 9,311,463 B2
(45) Date of Patent: Apr. 12, 2016

(54) MULTI-LEVEL PASSWORD AUTHORIZATION

(71) Applicant: INTERNATIONAL BUSINESS MACHINES CORPORATION, Armonk, NY (US)

(72) Inventor: Michael Sean Brown, Wahroonga (AU)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 14/191,497

(22) Filed: Feb. 27, 2014

(65) Prior Publication Data

US 2015/0242604 A1 Aug. 27, 2015

(51) Int. Cl.
*G06F 21/31* (2013.01)

(52) U.S. Cl.
CPC ........ *G06F 21/31* (2013.01); *G06F 2221/2113* (2013.01)

(58) Field of Classification Search
None
See application file for complete search history.

(56) References Cited

U.S. PATENT DOCUMENTS

| | | | | |
|---|---|---|---|---|
| 5,751,812 | A * | 5/1998 | Anderson | G06F 21/31 380/28 |
| 7,424,615 | B1 * | 9/2008 | Jalbert | H04L 9/3273 380/283 |
| 8,528,072 | B2 | 9/2013 | Shi | |
| 8,631,007 | B1 * | 1/2014 | Blandford | G06Q 30/0241 707/736 |
| 2006/0272007 | A1 * | 11/2006 | Sweeley | G07C 9/00111 726/2 |
| 2007/0024422 | A1 * | 2/2007 | Doyen | G07C 9/00158 340/5.81 |
| 2007/0180504 | A1 * | 8/2007 | Hung | G06F 21/335 726/5 |
| 2008/0052384 | A1 * | 2/2008 | Marl | H04L 12/2807 709/223 |
| 2008/0099556 | A1 * | 5/2008 | Park | G06K 19/07345 235/382.5 |
| 2010/0122331 | A1 * | 5/2010 | Wang | G06F 21/31 726/6 |
| 2012/0084734 | A1 | 4/2012 | Wilairat | |
| 2013/0145453 | A1 | 6/2013 | Lemke | |
| 2015/0229632 | A1 * | 8/2015 | Lee | H04L 63/083 726/4 |

FOREIGN PATENT DOCUMENTS

WO 2013007573 1/2013

OTHER PUBLICATIONS

Cipriani, Jason; Set a lock code for individual apps on Android; CNET How to (URL: http://howto.cnet.com/8301-11310_39-57376601-285/set-a-lock-code-for . . . ); Feb. 13, 2012; 8 pages.

* cited by examiner

*Primary Examiner* — Samson Lemma
*Assistant Examiner* — Wayne An
(74) *Attorney, Agent, or Firm* — Schmeiser, Olsen & Watts; John Pivnichny

(57) ABSTRACT

A method and system for using multi-level passwords is provided. The method includes receiving a request for access to a first level of access associated with secure components associated with a device of a user. In response, a portion of a passcode is received. The portion of the passcode does not include an entire portion. The portion of the passcode is compared to security group policy it is determined that the portion of the passcode meets requirements the security group policy. Access is enabled to a group of components of secure components based on the security requirements. The group of components is associated with the first level of security access.

17 Claims, 6 Drawing Sheets

MULTI-LEVEL PASSWORD AUTHORIZATION

FIELD

The present invention relates generally to a method for generating levels of security for applications or data and in particular to a method and associated system for using multilevel passwords for accessing the differing levels of security for the applications or data.

BACKGROUND

Accessing information typically includes an inaccurate process with little flexibility. Preventing access to varying information types may include a complicated process that may be time consuming and require a large amount of resources. Accordingly, there exists a need in the art to overcome at least some of the deficiencies and limitations described herein above.

SUMMARY

A first aspect of the invention provides a method comprising: receiving, by a computer processor of a device from a user, a request for access to a first level of access associated with secure components associated with the device of the user; presenting, by the computer processor to the user in response to the request, a passcode entry graphical user interface (GUI); receiving, by the computer processor, a first portion of a passcode, wherein the first portion of the passcode does not include an entire portion of the passcode; comparing, by the computer processor, the first portion of the passcode to a first security group policy; determining, by the computer processor based on results of the comparing, the first portion of the passcode meets requirements of the first security group policy, wherein the first security group policy is associated with the first level of security access associated with the secure components; and enabling, by the computer processor based on the first security requirements, access to a first group of components of the secure components, wherein the first group of components is associated with the first level of security access.

A second aspect of the invention provides a device comprising a computer processor coupled to a computer-readable memory unit, the memory unit comprising instructions that when executed by the computer processor implements a method comprising: receiving, by the computer processor from a user, a request for access to a first level of access associated with secure components associated with the device of the user; presenting, by the computer processor to the user in response to the request, a passcode entry graphical user interface (GUI); receiving, by the computer processor, a first portion of a passcode, wherein the first portion of the passcode does not include an entire portion of the passcode; comparing, by the computer processor, the first portion of the passcode to a first security group policy; determining, by the computer processor based on results of the comparing, the first portion of the passcode meets requirements of the first security group policy, wherein the first security group policy is associated with the first level of security access associated with the secure components; and enabling, by the computer processor based on the first security requirements, access to a first group of components of the secure components, wherein the first group of components is associated with the first level of security access.

A third aspect of the invention provides a computer program product, comprising a computer readable hardware storage device storing a computer readable program code, the computer readable program code comprising an algorithm that when executed by a computer processor of a device implements a method, the method comprising: receiving, by the computer processor from a user, a request for access to a first level of access associated with secure components associated with the device of the user; presenting, by the computer processor to said user in response to said request, a passcode entry graphical user interface (GUI); receiving, by the computer processor, a first portion of a passcode, wherein the first portion of the passcode does not include an entire portion of the passcode; comparing, by the computer processor, the first portion of the passcode to a first security group policy; determining, by the computer processor based on results of the comparing, the first portion of the passcode meets requirements of the first security group policy, wherein the first security group policy is associated with the first level of security access associated with the secure components; and enabling, by the computer processor based on the first security requirements, access to a first group of components of the secure components, wherein the first group of components is associated with the first level of security access.

The present invention advantageously provides a simple method and associated system capable of accessing information.

DETAILED DESCRIPTION

Figure 1C:
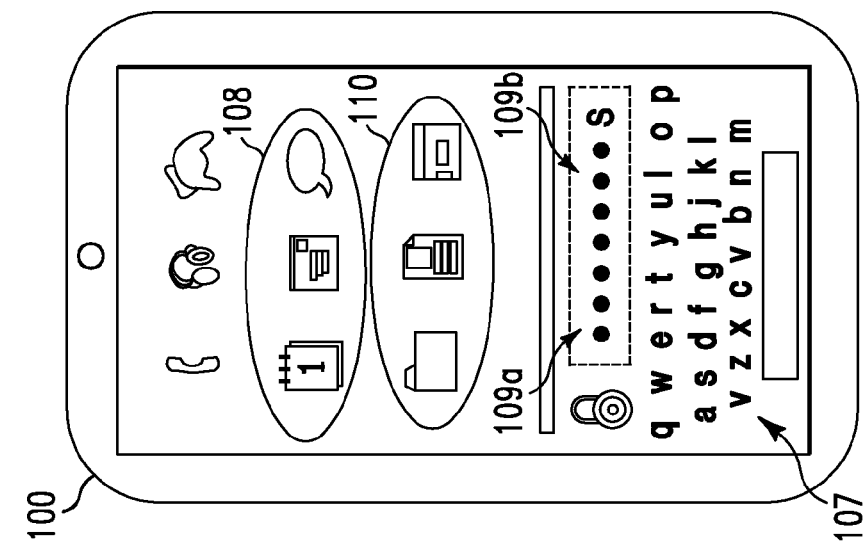
FIGS. 1A-1C illustrate a process associated with a device for enabling different levels of security with respect to accessing information, in accordance with embodiments of the present invention.
Figure 1B:
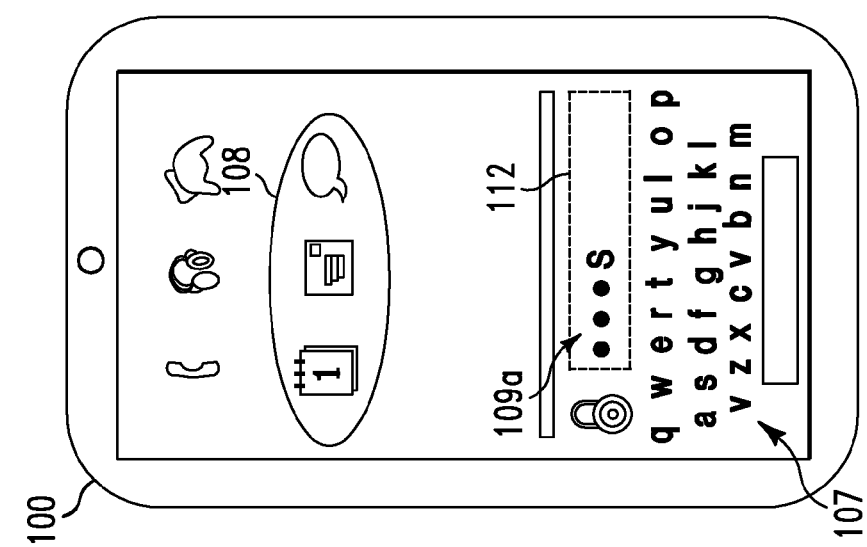
Figure 1A:
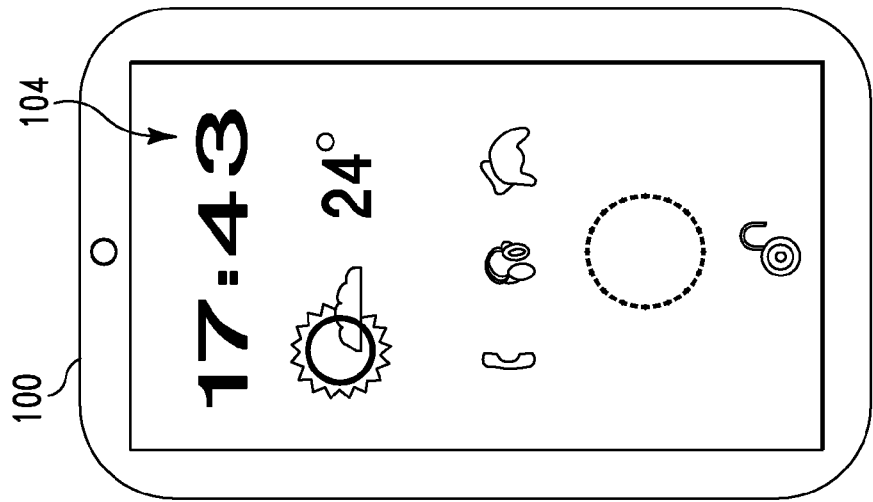

FIGS. 1A-1C illustrate a process associated with a device 100 for enabling different levels of security with respect to accessing information, in accordance with embodiments of the present invention. Device 100 may include, inter alia, a smart phone, a computer, a tablet computer, a PDA, etc.

Device 100 enables a process for acquiring rules that are pre-defined for different security levels. The rules define a type and scope of components that may be accessed with respect to different security levels. The components for access may be located within device 100. Alternatively, the components for access may be located remotely within a remote system connected to device 100. For example, the components may be located remotely within, inter alia, a remote server, a secure Website, a remote storage system, etc. The components may include, inter alia, secure data, secure functions, secure applications, etc. Device 100 enables a process that includes:

1. Receiving an input password (or passcode) that includes at least one portion of an entire passcode that corresponds to a lowest level of security. Note that the term passcode is defined herein as any type of code enabling access to secure components. For example, a passcode may include, inter alia, a password, a PIN, a voice enabled code, a passphrase, etc.
2. Determining a security level based on the at least one portion of the entire password.
3. Rendering relevant component access based on the determined security level.

Device 100 allows a user or an enterprise IT department to determine different levels of security for different applications or data types thereby balancing usability and security for an end user of device 100. The different levels may be enabled based on secret keys (e.g., PINs, passwords, pass phrases, etc.), pattern based entry, etc. In order to implement the different levels, the secret key is divided into portions (or sections) and each divided portion is mapped to a different security level. For example, if a user's passcode is 12345678, the following mapping may be defined:

1. Powering on device 100 allows instant access to applications with no confidentiality ratings. For example a clock, weather display, and games may be accessed.
2. If the user enters the first four digits of the passcode (i.e., 1234), low security applications, such as the users email, calendar, and social media applications may be accessed.
3. If the user continues to enter the next four digits of the passcode (i.e., 5678), applications (with higher security requirements) such as user work email and documents may be accessed.

FIG. 1A illustrates a locked version of device 100 (e.g., a smartphone) displaying and allowing access to non-confidential information 104. For example, a current time and weather is displayed. Additionally, the non-confidential information 104 (being displayed for access) includes applications such as games, phone, and music.

FIG. 1B illustrates a soft keyboard 107 being displayed and a portion 109a (e.g., dogs) of a password (e.g., dogscats) entered in an entry field 112 (i.e., the first four letters of the password are entered). Entered portion 109a of the password enables access to low security applications 108 appearing on a display of device 100. For example, the low security applications include the user's personal calendar, email, and chat services.

FIG. 1C illustrates soft keyboard 107 being displayed and an additional portion 109b (e.g., cats) of the password (e.g., dogscats) entered in entry field 112. Entered portion 109b in combination with previously entered portion 109a enables access to high security work related applications 110. For example, the high security work related applications 110 may include documents, presentations, and corporate credit card information.

Figure 2C:
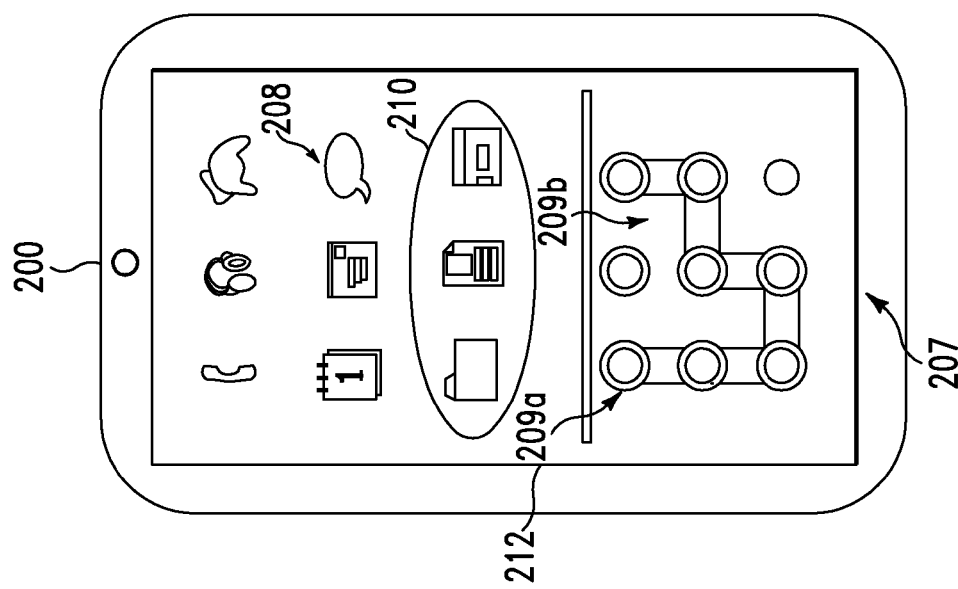
FIGS. 2A-2C illustrate an alternative device with respect to the device of FIGS. 1A-1C, in accordance with embodiments of the present invention.
Figure 2B:
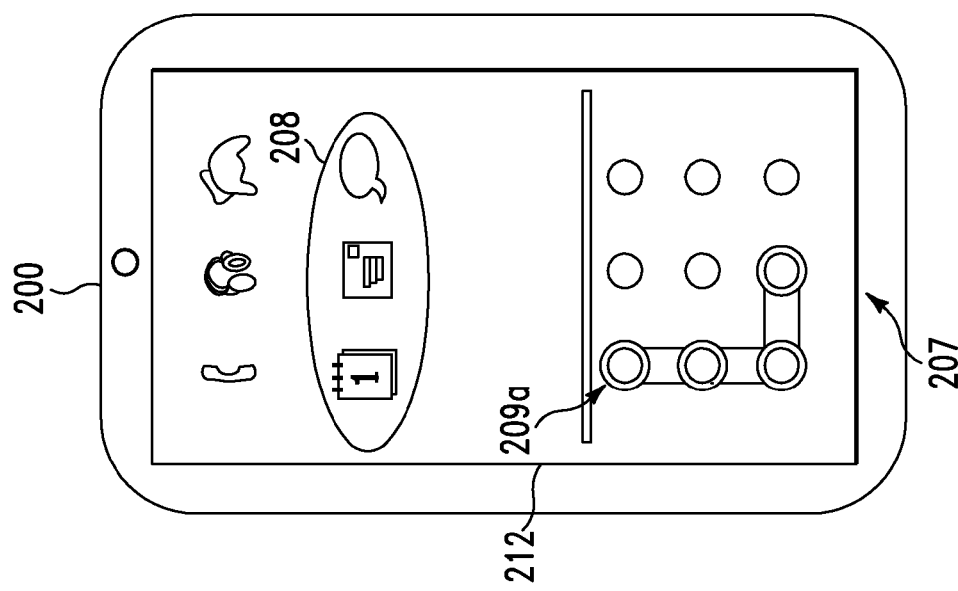
Figure 2A:
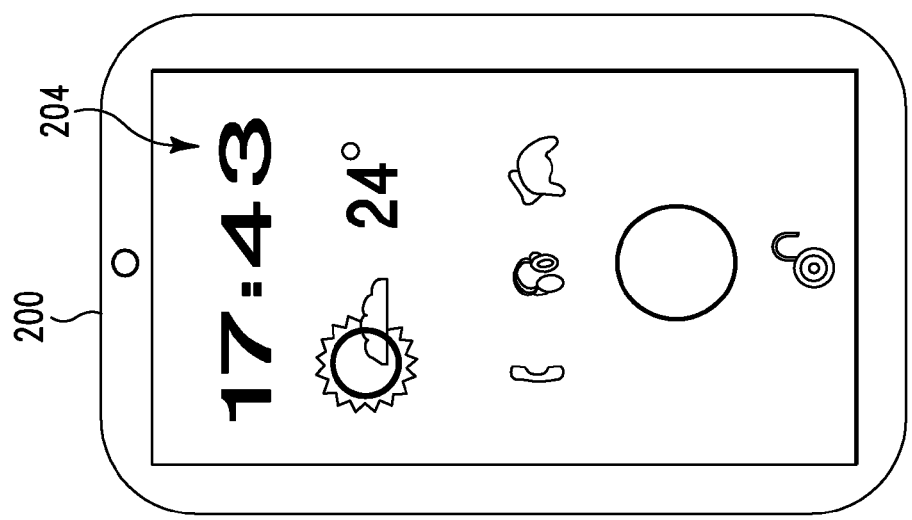

FIGS. 2A-2C illustrate an alternative device 200 with respect to device 100 of FIGS. 1A-1C, in accordance with embodiments of the present invention. In contrast to device 100 of FIGS. 1A-1C, device 200 of FIGS. 2A-2C enables an eight point security pattern to gain access to different security levels associated with differing components.

FIG. 2A illustrates a locked version of device 200 (e.g., a smartphone) displaying and allowing access to non-confidential information 204. For example, a current time and weather is displayed. Additionally, the non-confidential information 104 (being displayed for access) includes applications such as games, phone, and music.

FIG. 2B illustrates a soft keypad 207 being displayed and a portion 209a (e.g., 4 enabled points in a specified pattern) of a passcode (e.g., that includes eight enabled points in a specified pattern) entered (i.e., the first four points of the passcode are entered). Entered portion 209a of the passcode enables access to low security applications 208 appearing on a display of device 200. For example, the low security applications include the user's personal calendar, email, and chat services.

FIG. 2C illustrates soft keyboard 207 being displayed and an additional portion 209b (i.e., four additional points are entered in addition to the first four points of the passcode previously entered) of the passcode entered. Entered portion 209b in combination with previously entered portion 209a enables access to high security work related applications 210. For example, the high security work related applications 210 may include documents, presentations, and corporate credit card information.

Figure 3C:
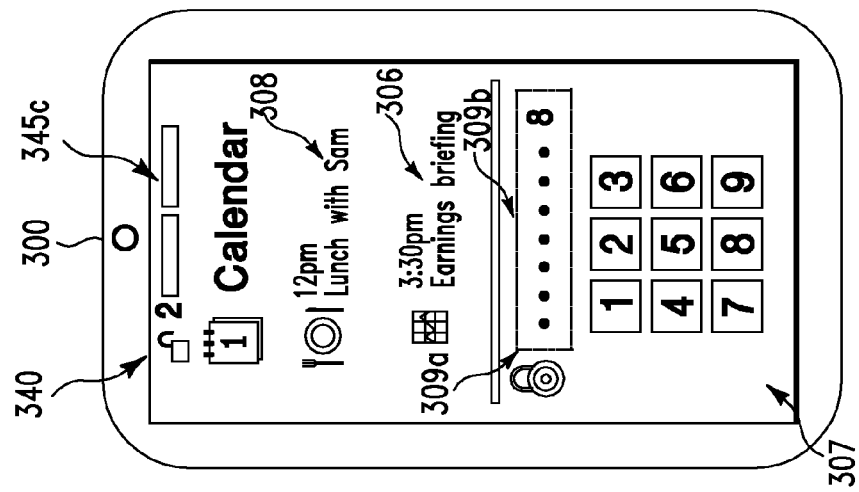
FIGS. 3A-3C illustrate a process associated with a device for enabling different levels of security with respect to accessing information, in accordance with embodiments of the present invention.
Figure 3B:
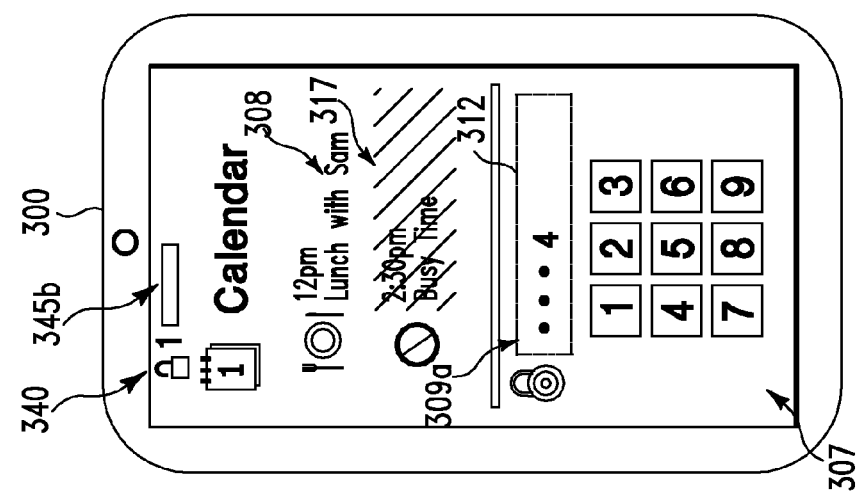
Figure 3A:
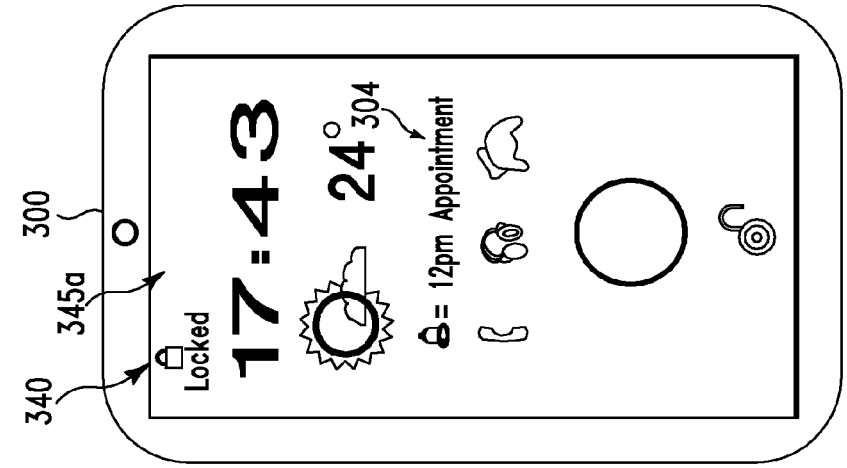

FIGS. 3A-3C illustrate a process associated with a device 300 for enabling different levels of security with respect to accessing information, in accordance with embodiments of the present invention. Device 300 comprises a numeric keypad 307 (i.e., as illustrated in FIGS. 3B and 3C) for entering and a passcode (e.g., an eight digit passcode) and a calendar application that is enabled to support multi-level passwords. Additionally, device 300 may optionally display a current granted security level (i.e., via a security level indicator 340) so that a user may determine (e.g., at a glance) at what level differing applications are accessible.

FIG. 3A illustrates device 300 after powering on a locked device. In this instance, a user may only see that he or she has an appointment 304 at 12 pm. No other details are available. Additionally, security level indicator 340 (in FIG. 3A) illustrates a locked status 345a.

FIG. 3B illustrates device 300 after four digits 309a (of a specified eight digit passcode) have been entered in an entry field 312. In this instance, the user may view the details 308 in their personal calendar (i.e., lunch with Sam). All other entries (from an employer's calendar system) are blocked out 317 due to a security policy. The user may only see that this time has been blocked out. Additionally, security level indicator 340 (in FIG. 3B) illustrates a first level (e.g., a low level) security status 345b.

FIG. 3C illustrates device 300 after four a full eight digit passcode (i.e., portion 309a and a portion 309b) has been entered. In this instance, work entries 306 may be viewed and edited. The use of multi-level passwords or passcodes enables a user (e.g., in a social situation) example to enter a portion (e.g., four digits) of a passcode to check personal email and a full passcode (e.g., eight characters) for work related email thereby increasing overall security without impacting a user experience. The aforementioned process may be extended to support more than three levels of security and may be enabled to work on different types of mobile or traditional devices. Additionally, the aforementioned process may be combined with encryption methods and and/or sandbox methods with respect to confidential components. Additionally, security level indicator 340 (in FIG. 3C) illustrates a second level (e.g., a high level) security status 345c.

Figure 4B:
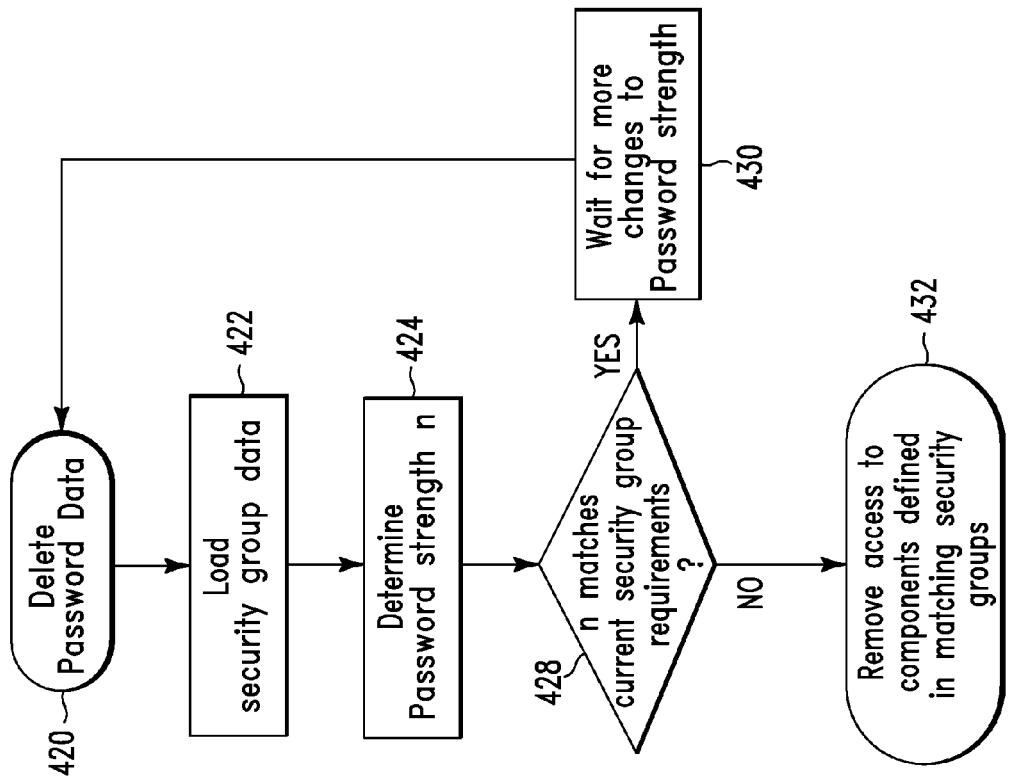
FIG. 4B illustrates an algorithm detailing a process flow enabled by the devices of FIGS. 1A-3C of FIG. 1 for disabling access to components, in accordance with embodiments of the present invention.
Figure 4A:
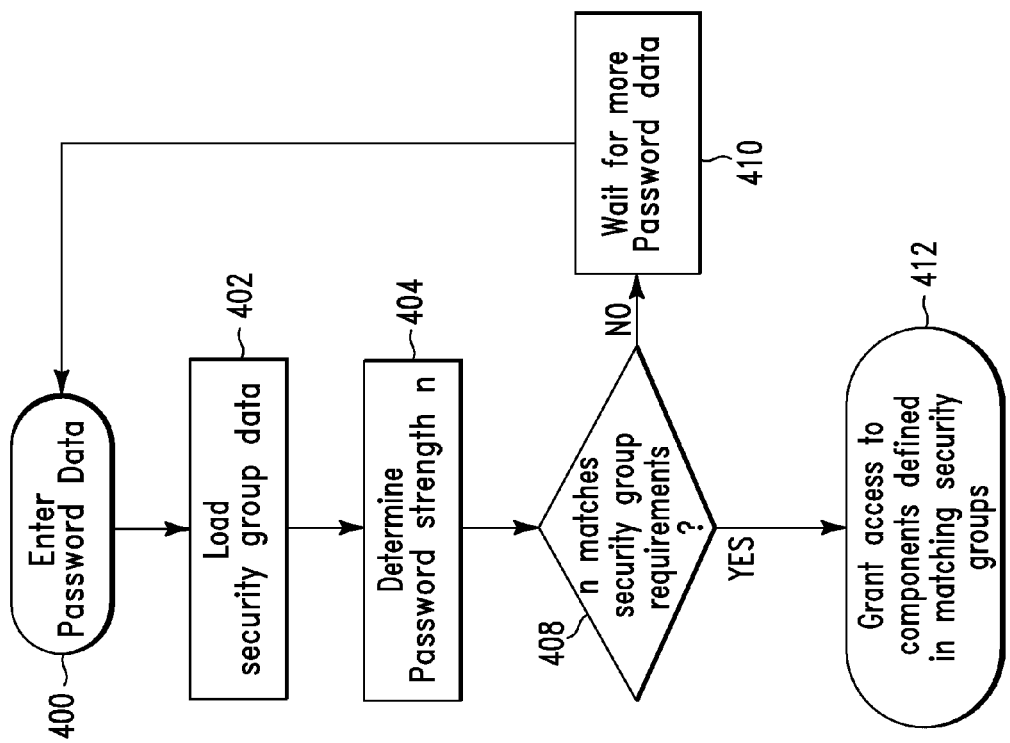
FIG. 4A illustrates an algorithm detailing a process flow enabled by the devices of FIGS. 1A-3C of FIG. 1 for enabling access to components, in accordance with embodiments of the present invention.

FIG. 4A illustrates an algorithm detailing a process flow enabled by the devices of FIGS. 1A-3C of FIG. 1 for enabling access to components, in accordance with embodiments of the present invention. Each of the steps in the algorithm of FIG. 4A may be enabled and executed in any order by a computer processor executing computer code. In step 400, a password (or portion of) is entered into a device. In step 402, security group data (associated with levels of security) is loaded into the device (e.g., from and internal memory or remotely from an external system). In step 404, a strength n of the entered password is determined. In step 408, it is determined if the password strength n matches security group requirements (e.g., checking against all levels of security groups such as unlocking one or more levels of security groups). If in step 408, it is determined that the password strength n matches security group requirements then in step 412, access to components defined in matching security groups is granted. If in step 408, it is determined that the password strength n does not match security group requirements then in step 410, the device waits for more password data (for the password) and step 400 is repeated.

FIG. 4B illustrates an algorithm detailing a process flow enabled by the devices of FIGS. 1A-3C of FIG. 1 for disabling access to components, in accordance with embodiments of the present invention. Each of the steps in the algorithm of FIG. 4B may be enabled and executed in any order by a computer processor executing computer code. In step 420, a password (or portion of) is deleted from a device. In step 422, security group data (associated with levels of security) is loaded into the device (e.g., from and internal memory or remotely from an external system). In step 424, a strength n of the entered password is determined. In step 428, it is determined if the password strength n matches security group requirements. If in step 428, it is determined that the password strength n does not match security group requirements then in step 432, access to components defined in matching security groups is removed. If in step 428, it is determined that the password strength n does match security group requirements then in step 430, the device waits for changes to a password strength and step 420 is repeated.

Figure 5:
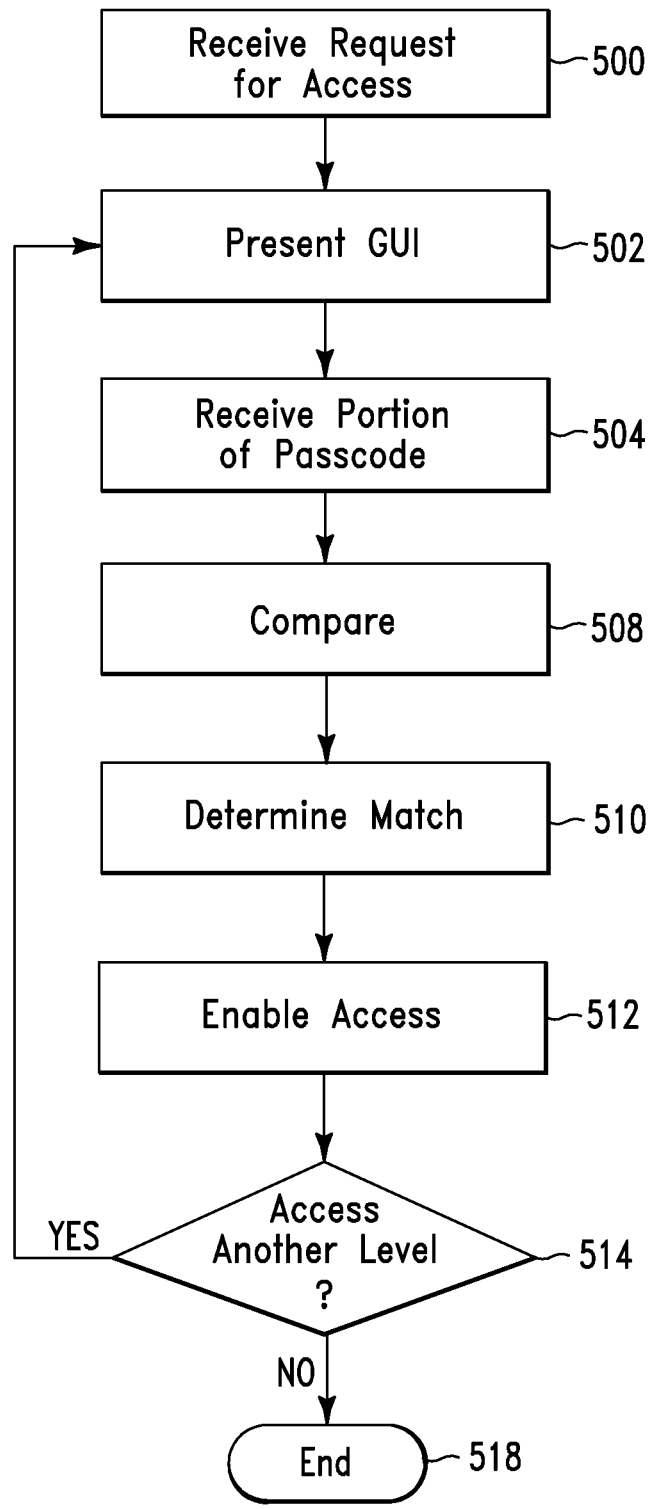
FIG. 5 illustrates an algorithm detailing a process flow enabled by the devices of FIGS. 1A-3C of FIG. 1 for enabling different levels of security with respect to accessing information, in accordance with embodiments of the present invention.

FIG. 5 illustrates an algorithm detailing a process flow enabled by the devices of FIGS. 1A-3C of FIG. 1 for enabling different levels of security with respect to accessing information, in accordance with embodiments of the present invention. Each of the steps in the algorithm of FIG. 5 may be enabled and executed in any order by a computer processor executing computer code. In step 500, a request for access to a first level of access (related to secure components related to a device of a user) is received (by the device) from the user. In step 502, a passcode entry graphical user interface (GUI) is presented to the user in response to the request of step 500. In step 504, a portion (that may not include an entire portion) of a passcode is received. In step 508, the portion of the passcode is compared to a security group policy. In step 510, it is determined that the portion of the passcode meets requirements of the security group policy. The security group policy is associated with the first level of security access associated with the secure components. In step 512, access to first group of components of the secure components is enabled based on the first level of security access. In step 514, it is determined if another level of security access is requested. If in step 514, it is determined that another level of security access is requested then step 502 is repeated for receiving another portion of the passcode in addition to the already entered portion of the passcode and enabling access to anther security level associated with additional components. Additionally, a process may be performed for removing the additional portion of the passcode and returning to the original level of security associated with the originally accessed components. Furthermore, an indicator indicating a specified level of security may be presented to the user.

Figure 6:
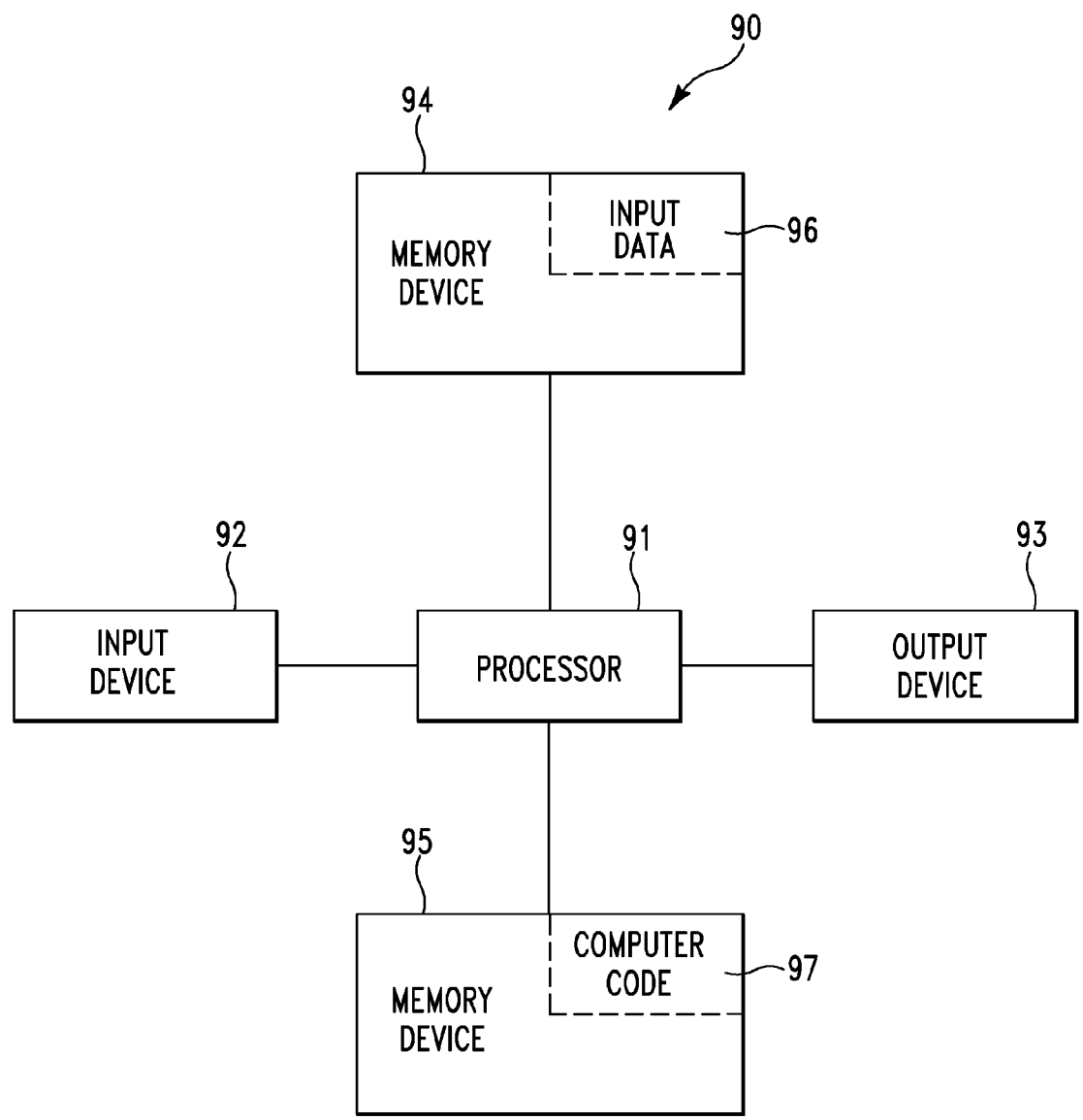
FIG. 6 illustrates a computer system used by or comprised by the devices of FIGS. 1A-3C for enabling different levels of security with respect to accessing information, in accordance with embodiments of the present invention.

FIG. 6 illustrates a computer system 90 used by or comprised by the devices of FIGS. 1A-3C for enabling different levels of security with respect to accessing information, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 4 and 5) for enabling different levels of security with respect to accessing information. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may include the algorithms of FIGS. 4 and 5 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to enable different levels of security with respect to accessing information. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling different levels of security with respect to accessing information. In another embodiment, the invention provides a business method that performs the process steps of the invention on a subscription, advertising, and/or fee basis. That is, a service supplier, such as a Solution Integrator, could offer to enable different levels of security with respect to accessing information. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:
receiving, by a computer processor of a device of a user, a request for access to a first level of access associated with secure components associated with said device of said user;
presenting, by said computer processor to said user in response to said request, a passcode entry graphical user interface (GUI);
receiving, by said computer processor, a first portion of a passcode, wherein said first portion of said passcode does not include an entire portion of said passcode;
comparing, by said computer processor, said first portion of said passcode to a first security group policy;
determining, by said computer processor based on results of said comparing, said first portion of said passcode meets requirements of said first security group policy, wherein said first security group policy is associated with said first level of security access associated with said secure components;
enabling, by said computer processor based on first security requirements, access to a first group of components of said secure components, wherein said first group of components is associated with said first level of security access;
presenting, by said computer processor to said user, said passcode entry GUI;
receiving, by said computer processor, a second portion of said passcode, wherein said first portion differs from said second portion;
combining, by said computer processor, said second portion with said first portion;
first comparing, by said computer processor, said first portion in combination with said second portion to a second security group policy;
determining, by said computer processor based on results of said first comparing, said first portion in combination with said second portion meets requirements of said second security group policy, wherein said first security group policy differs from said second security group policy, wherein said second security group policy is associated with a second level of security access associated with said secure components, and wherein said second level of security access comprises a higher level of security access than said first level of security access; and
enabling, by said computer processor based on said second security group policy, access to a second group of components of said secure components, wherein said first group of components differs from said second group of components, and wherein said second group of components is associated with said second level of security access.

2. The method of claim 1, further comprising:
presenting, by said computer processor to said user, said passcode entry GUI comprising said first portion in combination with said second portion of said passcode;
removing, by said computer processor in response to a command from said user, second portion of said passcode resulting in only said first portion of said passcode;
first comparing, by said computer processor, said first portion to said first security group policy and said second security group policy;
additionally determining, by said computer processor based on results of said first comparing, said first portion meets said requirements of said first security group policy; and
disabling, by said computer processor based on results of said additionally determining, access to said second group of components of said secure components.

3. The method of claim 1, further comprising:
presenting, by said computer processor to said user, an indicator indicating said first level of security access and said second level of security access.

4. The method of claim 1, wherein said secure components comprise secure data, secure functions, or secure applications.

5. The method of claim 1, wherein said secure components are comprised by a device of said user.

6. The method of claim 5, wherein said device is selected from the group consisting of a smart phone, a computer, a tablet computer, and a PDA.

7. The method of claim 1, wherein said secure components are comprised by a remote system connected to a device of said user.

8. The method of claim 1, further comprising:
providing at least one support service for at least one of creating, integrating, hosting, maintaining, and deploying computer-readable code in the device, said code being executed by the computer processor to implement: said receiving said request for access said presenting, said receiving said first portion, said comparing, said determining, and said enabling.

9. A device comprising a computer processor coupled to a computer-readable memory unit, said memory unit comprising instructions that when executed by the computer processor implements a method comprising:
receiving, by said computer processor from a user, a request for access to a first level of access associated with secure components associated with a device of said user;
presenting, by said computer processor to said user in response to said request, a passcode entry graphical user interface (GUI);
receiving, by said computer processor, a first portion of a passcode, wherein said first portion of said passcode does not include an entire portion of said passcode;
comparing, by said computer processor, said first portion of said passcode to a first security group policy;
determining, by said computer processor based on results of said comparing, said first portion of said passcode meets requirements of said first security group policy, wherein said first security group policy is associated with said first level of security access associated with said secure components;
enabling, by said computer processor based on first security requirements, access to a first group of components of said secure components, wherein said first group of components is associated with said first level of security access;
presenting, by said computer processor to said user, said passcode entry GUI;
receiving, by said computer processor, a second portion of said passcode, wherein said first portion differs from said second portion;
combining, by said computer processor, said second portion with said first portion;

first comparing, by said computer processor, said first portion in combination with said second portion to a second security group policy;
determining, by said computer processor based on results of said first comparing, said first portion in combination with said second portion meets requirements of said second security group policy, wherein said first security group policy differs from said second security group policy, wherein said second security group policy is associated with a second level of security access associated with said secure components, and wherein said second level of security access comprises a higher level of security access than said first level of security access; and
enabling, by said computer processor based on said second security group policy, access to a second group of components of said secure components, wherein said first group of components differs from said second group of components, and wherein said second group of components is associated with said second level of security access.

10. The device of claim 9, wherein said method further comprises:
presenting, by said computer processor to said user, said passcode entry GUI comprising said first portion in combination with said second portion of said passcode;
removing, by said computer processor in response to a command from said user, said second portion of said passcode resulting in only said first portion of said passcode;
first comparing, by said computer processor, said first portion to said first security group policy and said second security group policy;
additionally determining, by said computer processor based on results of said first comparing, said first portion meets said requirements of said first security group policy; and
disabling, by said computer processor based on results of said additionally determining, access to said second group of components of said secure components.

11. The device of claim 9, wherein said method further comprises:
presenting, by said computer processor to said user, an indicator indicating said first level of security access and said second level of security access.

12. The device of claim 9, wherein said secure components comprise secure data, secure functions, or secure applications.

13. The device of claim 9, wherein said secure components are comprised by a device of said user.

14. The device of claim 13, wherein said device is selected from the group consisting of a smart phone, a computer, a tablet computer, and a PDA.

15. The device of claim 9, wherein said secure components are comprised by a remote system connected to a device of said user.

16. A computer program product, comprising a computer readable hardware storage device storing a computer readable program code, said computer readable program code comprising an algorithm that when executed by a computer processor of a device implements a method, said method comprising:
receiving, by said computer processor from a user, a request for access to a first level of access associated with secure components associated with said device of said user;
presenting, by said computer processor to said user in response to said request, a passcode entry graphical user interface (GUI);
receiving, by said computer processor, a first portion of a passcode, wherein said first portion of said passcode does not include an entire portion of said passcode;
comparing, by said computer processor, said first portion of said passcode to a first security group policy;
determining, by said computer processor based on results of said comparing, said first portion of said passcode meets requirements of said first security group policy, wherein said first security group policy is associated with said first level of security access associated with said secure components;
enabling, by said computer processor based on first security requirements, access to a first group of components of said secure components, wherein said first group of components is associated with said first level of security access;
presenting, by said computer processor to said user, said passcode entry GUI;
receiving, by said computer processor, a second portion of said passcode, wherein said first portion differs from said second portion;
combining, by said computer processor, said second portion with said first portion;
first comparing, by said computer processor, said first portion in combination with said second portion to a second security group policy;
determining, by said computer processor based on results of said first comparing, said first portion in combination with said second portion meets requirements of said second security group policy, wherein said first security group policy differs from said second security group policy, wherein said second security group policy is associated with a second level of security access associated with said secure components, and wherein said second level of security access comprises a higher level of security access than said first level of security access; and
enabling, by said computer processor based on said second security group policy, access to a second group of components of said secure components, wherein said first group of components differs from said second group of components, and wherein said second group of components is associated with said second level of security access.

17. The computer program product of claim 16, wherein said method further comprises:
presenting, by said computer processor to said user, said passcode entry GUI comprising said first portion in combination with said second portion of said passcode;
removing, by said computer processor in response to a command from said user, said second portion of said passcode resulting in only said first portion of said passcode;
first comparing, by said computer processor, said first portion to said first security group policy and said second security group policy;
additionally determining, by said computer processor based on results of said first comparing, said first portion meets said requirements of said first security group policy; and
disabling, by said computer processor based on results of said additionally determining, access to said second group of components of said secure components.

* * * * *